(12) United States Patent
Shuaib et al.

(10) Patent No.: US 10,195,956 B2
(45) Date of Patent: Feb. 5, 2019

(54) SECURE CHARGING METHOD FOR ELECTRIC VEHICLES

(71) Applicant: UNITED ARAB EMIRATES UNIVERSITY, Al Ain (AE)

(72) Inventors: Khaled Shuaib, Al Ain (AE); Ezedin Barka, Al Ain (AE); Juhar Ahmed, Al Ain (AE); Farag Sallabi, Al Ain (AE)

(73) Assignee: United Arab Emirates University, Al-Ain (AE)

( * ) Notice: Subject to any disclaimer, the term of this patent is extended or adjusted under 35 U.S.C. 154(b) by 31 days.

(21) Appl. No.: 15/613,096

(22) Filed: Jun. 2, 2017

(65) Prior Publication Data

US 2018/0345810 A1 Dec. 6, 2018

(51) Int. Cl.
*H02J 7/00* (2006.01)
*B60L 11/18* (2006.01)
(Continued)

(52) U.S. Cl.
CPC ....... *B60L 11/1844* (2013.01); *B60L 11/1816* (2013.01); *H02J 7/0027* (2013.01);
(Continued)

(58) Field of Classification Search
CPC ... Y02T 90/14; Y02T 10/7005; Y02T 90/128; Y02T 10/7088; Y02T 90/163
(Continued)

(56) References Cited

U.S. PATENT DOCUMENTS 9,003,492 B2  4/2015  Katar et al.
9,058,566 B2  6/2015  Oba et al.
(Continued)

FOREIGN PATENT DOCUMENTS

EP       2579417 A1    4/2013
KR  1020100059641 A    6/2010
(Continued)

OTHER PUBLICATIONS

Herron, "Why We Need Open Charge Protocols for Electric Cars in the U.S.," Sep. 27, 2013, printed from http://www.plugincars.com/open-charge-alliance-sets-out-fix-electric-car-charging-industry-128417.html on Dec. 16, 2016; 5 pages.
(Continued)

*Primary Examiner* — Arun C Williams
(74) *Attorney, Agent, or Firm* — Richard C. Litman

(57) ABSTRACT

The method of location-based charging for electric vehicles provides for secure charging of electric vehicles by applying various charging mechanisms depending on users' and suppliers' specific attributes. When an operator of an electric vehicle connects the electric vehicle to electric vehicle supply equipment, a message is securely received by the electric vehicle supply equipment, which includes a set of operator-specific parameters. Based on the set of operator-specific parameters, a secure notification is transmitted to an owner of the electric vehicle supply equipment requesting authorization for the operator to charge the electric vehicle. The applicable charging mechanism of the electric vehicle is applied based on the owner's authorization message transmitted to the electric vehicle supply equipment and the set of operator-specific parameters.

8 Claims, 3 Drawing Sheets

(51) Int. Cl.
*H04L 9/32* (2006.01)
*H04L 9/14* (2006.01)

(52) U.S. Cl.
CPC .............. *H04L 9/14* (2013.01); *H04L 9/3247* (2013.01); *B60L 11/1848* (2013.01); *B60L 2230/00* (2013.01); *H02J 2007/0001* (2013.01); *H02J 2007/0096* (2013.01)

(58) Field of Classification Search
USPC ....................................................... 320/109
See application file for complete search history.

(56) References Cited

U.S. PATENT DOCUMENTS

| | | | |
|---|---|---|---|
| 9,100,420 B2* | 8/2015 | Oh | H04L 67/125 |
| 9,331,525 B2 | 5/2016 | Minnoy et al. | |
| 2009/0210357 A1* | 8/2009 | Pudar | B60L 11/1816 |
| | | | 705/412 |
| 2009/0312903 A1* | 12/2009 | Hafner | B60L 8/003 |
| | | | 701/36 |
| 2009/0313103 A1* | 12/2009 | Ambrosio | B60L 8/00 |
| | | | 705/14.25 |
| 2010/0049737 A1* | 2/2010 | Ambrosio | B60L 11/1824 |
| | | | 705/412 |
| 2010/0145540 A1 | 6/2010 | McKenna | |
| 2010/0161482 A1 | 6/2010 | Littrell | |
| 2010/0301809 A1* | 12/2010 | Bhade | B60L 11/1824 |
| | | | 320/148 |
| 2011/0007824 A1 | 1/2011 | Bridges et al. | |
| 2011/0279082 A1* | 11/2011 | Hagenmaier, Jr. | B60L 11/1824 |
| | | | 320/109 |
| 2012/0262111 A1 | 10/2012 | Soong et al. | |
| 2012/0277927 A1 | 11/2012 | Watkins | |
| 2013/0024306 A1 | 1/2013 | Shah et al. | |
| 2014/0191722 A1* | 7/2014 | Usuki | H01M 10/44 |
| | | | 320/109 |
| 2016/0358472 A1* | 12/2016 | Bezak | G08G 1/133 |
| 2017/0024552 A1* | 1/2017 | Rodine | G06F 21/629 |
| 2017/0274792 A1* | 9/2017 | Vaughan | B60L 11/1844 |

FOREIGN PATENT DOCUMENTS

| | | |
|---|---|---|
| WO | 2011/094627 A1 | 8/2011 |
| WO | 2012/078822 A1 | 6/2012 |

OTHER PUBLICATIONS

Falk et al., "Securely connecting Electric Vehicles to the Smart Grid," International Journal of Advances in Internet Technology vol. 6, No. 12, pp. 57-67, 2013.

* cited by examiner

SECURE CHARGING METHOD FOR ELECTRIC VEHICLES

BACKGROUND OF THE INVENTION

1. Field of the Invention

The present invention relates to electric vehicles (EVs), and particularly to a method of location-based charging for electric vehicles which allows electric vehicle supply equipment to apply different charging mechanisms and further provides secure and private communication for users and exchanged data.

2. Description of the Related Art

Electric vehicle supply equipment (EVSE), sometimes referred to as an electric vehicle charging station, is used to charge plug-in electric vehicles (PEVs or plug-in EVs), such as electric battery powered vehicles, gasoline/electric battery powered vehicle hybrids and the like. EVSEs may be located in designated charging locations (similar to commercial gas stations), adjacent to parking spaces, at residences, etc. An EV operator may be associated with an account with a charging service provider (CSP) that may have preferences and/or settings that are specific to the EV operator. Examples of such preferences and/or settings include cost/pricing parameters, such as the cost of power that the EV operator is willing to pay for electrical energy at various times throughout the week and/or for one or more types of charging service (workplace, public parking, home), access credentials and/or roaming parameters for "home" vs. "foreign" CSPs, alerts and notification preferences (e.g., the type and frequency of alerts and notifications concerning a charging session that the driver wishes to receive), and the like. These preferences and/or settings may be entered, viewed, and/or managed by the EV operator through a service portal provided by the EV manufacturer and/or CSP, such as a portal, site or application which may be accessed through the Internet, a local area network, a wide area network or the like.

PEV specific preferences can be set and/or managed through the PEV's in-cabin user interface. These PEV specific parameters are not, however, EV operator specific. Thus, different EV operators with access to the same PEV (e.g., family members or users of a fleet of shared EVs) cannot practically use this method to set or choose different EV operator specific preferences. Currently, data exchange between the PEV and the EVSE is limited to the parameters related to the embedded control of energy transfer and related safety provisions. Neither PEV-level nor PEV operator specific parameters can be exchanged between the PEV and EVSE using presently existing systems. Thus, a method of location-based charging for electric vehicles solving the aforementioned problems is desired.

SUMMARY OF THE INVENTION

The method of location-based charging for electric vehicles provides for charging of electric vehicles (EVs), such as plug-in electric vehicles (PEVs), electric battery powered vehicles, gasoline/electric battery powered vehicle hybrids and the like, at variable charging rates (CRs). When an operator of an electric vehicle connects the electric vehicle to electric vehicle supply equipment (EVSE), a message is received by the electric vehicle supply equipment including a set of operator-specific parameters. The operator-specific parameters include operator identification data, identification data representative of a home supplier associated with the operator, electric vehicle identification data, a requested power amount and a charging end time.

A determination is made from the set of operator-specific parameters if the operator is a home user having private privileged access to the electric vehicle supply equipment. If the operator is determined to be a home user, the EVSE charges the EV. If, however, the operator is determined to not be a home user, a notification message is transmitted to an owner of the electric vehicle supply equipment. The owner transmits an authorization message back to the EVSE. If the authorization message authorizes the operator of the electric vehicle as a guest user, with no fees charged to the operator of the EV, then the battery of the EV is charged and a charging fee associated therewith is debited from an account of the owner of the electric vehicle supply equipment.

The authorization message may also either deny access to the EVSE to the operator of the EV, or authorize the operator to use the EVSE for a fee. In the latter case, it is determined if the operator of the electric vehicle is requesting internal roaming charging (IRC) or external roaming charging (ERC). Internal roaming charging is charging of the battery of the electric vehicle at electric vehicle supply equipment not associated with the operator (i.e., EVSE which is not the operator's private, privileged access EVSE) but within a supplier network associated with the operator. External roaming charging is charging of the battery of the electric vehicle at electric vehicle supply equipment not belonging to the supplier network associated with the operator.

An internal charging rate is associated with internal roaming charging (IRC) and an external charging rate is associated with external roaming charging (ERC). Once it is determined whether the operator of the EV is requesting IRC or ERC, the battery of the electric vehicle is charged and the operator's account is debited by a charging fee based on whether the internal charging rate or the external charging rate is being applied.

With regard to security and privacy, a charging request, transmitted from the operator of the electric vehicle to the electric vehicle supply equipment, is encrypted dependent upon whether it is determined that the operator is requesting IRC or ERC. In the case of IRC, dual signature encryption is applied to the charging request, and in the case of ERC, triple signature encryption is applied to the charging request. For the dual signature encryption used in IRC, the charging request is divided into two portions: charging order information (COI) and billing information (BI), and each is encrypted using a unique encryption protocol. The COI is transmitted to a visiting aggregator (VAG) and the BI is transmitted to the operator's home supplier (HS), thus allowing the VAG to receive necessary information but removing access to the operator's personal information (contained in the BI) from the VAG. Similarly, for the triple signature encryption used in ERC, the charging request is divided into three portions: the COI, authorization information (AI), and the BI. In this case, each part is, once again, encrypted using a unique encryption protocol. The COI is transmitted to an external aggregator (EAG), the AI is transmitted to a broker (BR), and the BI is again transmitted to the HS.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
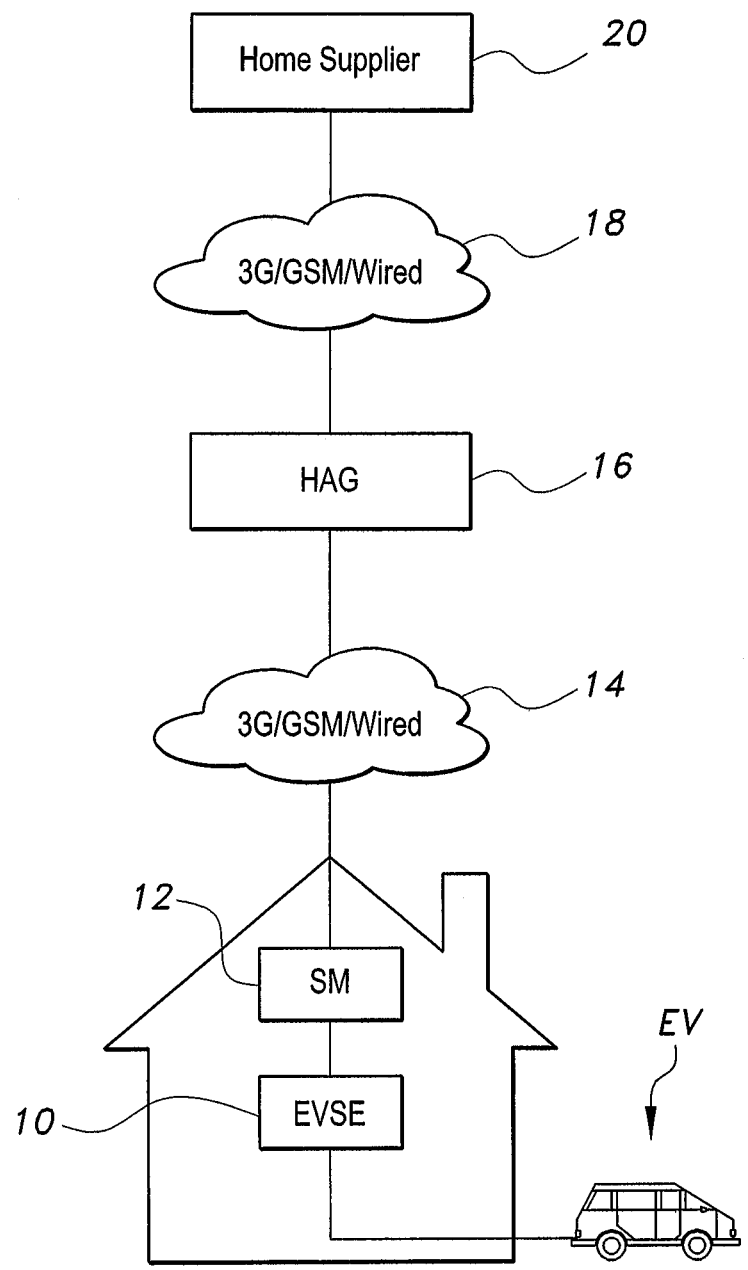
FIG. 1 diagrammatically illustrates a method of location-based charging for electric vehicles according to the present invention operating in a private home charging mode.

A method of secure charging for electric vehicles provides for charging of electric vehicles (EVs), such as plug-in electric vehicles (PEVs), electric battery powered vehicles, gasoline/electric battery powered vehicle hybrids and the like, at variable charging rates (CRs). The method includes connecting an electric vehicle by an operator to electric vehicle supply equipment (EVSE), transmitting operator-specific parameters to the EVSE, charging the battery of the electric vehicle and debiting a charging fee associated therewith from an account of the owner of the electric vehicle supply equipment if authorized to do so. Preferably, the operator-specific parameters are stored on a smart card (SC) or the like. The operator can insert the smart card into the EVSE to transmit the operator-specific parameters to the EVSE, to begin the charge authorization process. The operator-specific parameters include operator identification data, identification data representative of a home supplier associated with the operator, electric vehicle identification data, a requested power amount and a charging end time.

When the EVSE receives a message including the set of operator-specific parameters, a determination must be made as to whether the operator is a home user or not. The set of operator-specific parameters can establish whether the operator is a home user having private privileged access to the electric vehicle supply equipment. If the operator is determined to be a home user, the EVSE charges the EV. Specifically, if the user is a private privileged user, authorization can be performed locally on the EVSE or on a local authorization server (for private charging in companies). Otherwise, authorization can be performed by contacting the home supplier remotely. To be able to check whether the user is a home user or not, before charging, information about authorized members who are allowed to charge a certain vehicle using the home charging point can be saved to the EVSE or the local database (for private company charging).

Users can establish a contract with suppliers by registering their EVs and a list of authorized users who are allowed to charge those EVs. A unique user ID ($U_{ID}$) is assigned to each user during registration. Suppliers can also provide users with smart cards (SCs) which contain data about the user and the supplier itself. The use of smart cards helps to avoid misuse of PEVs and to implement fair payment, as it allows user-based authentication and multiple user billing. The information stored on the smart card preferably includes public/private key pairs of the user (for encryption and privacy, as will be described in detail below), the $U_{ID}$ of the user, a public key of the supplier and a hash of the supplier ID ($S_{ID}$). However, the private key of the user is stored encrypted in the smart card and can only be retrieved when the user enters the correct personal identity number (PIN) provided during registration. Each EV is provided with a unique vehicle ID ($V_{ID}$) during production and suppliers can uniquely identify any EV using its ID. Preferably, for privacy reasons, EVs do not use their real IDs during charging. Instead, suppliers can generate a set of pseudonym IDs ($P_{ID}$) that map to the real vehicle ID to be used during charging instead of the real ID. Suppliers keep the mapping between the real ID and the corresponding pseudonym ID in their database. Apart from this, the set of pseudonym IDs ($P_{ID}$) are also stored in the EV's firmware. Therefore, at the time of charging, the EV can pick one $P_{ID}$ at random and use it to request charging.

In addition to real vehicle ID-to-pseudonym ID mapping, suppliers can also keep data about users and the list of vehicles allowed for them in their data base. This information is required to avoid misuse of EVs and to enable fair payment between users. Suppliers prepare certificates for all smart meters (SMs) and EVSEs which belong to them and configure them with their respective public/private key pairs. Further, a ring of public keys (the public key of the SM, the supplier and the broker) and the hash of the home supplier ID $h(HS_{ID})$ are stored in all EVSEs. The public keys of the aggregator and EVSE can also be installed on the SMs. In addition to this, for private EVSEs, data about the privileged users, such as the hash of the smart card number h(SCN) and the vehicle ID, can be saved in the EVSE's memory.

Following all of the initial registration steps, the suppliers can make a list of registered users available to the broker (BR) by uploading the list to a directory service that is accessible by the BR. Moreover, suppliers can regularly push new data to the directory as new users register and existing users leave. The BR, on the other hand, can update its database by pulling fresh data periodically.

When the operator initially connects the EV to the EVSE, and also inserts the smart card (SC) into a card reader (CRD), the charging point has a display screen where the user can view general information, such as the available charging type (level1, level2, level3, . . . ), charging rate (CR), maximum available amount of power, etc. The CR is the price information of electricity over a time period, which may vary over time based on change in supply and demand. Once the electric vehicle is connected to the EVSE and the user has inserted the smart card into the card reader, the smart card prompts the user for a password/PIN before the user can start charging. When the operator enters the PIN, a screen on the interface of the EVSE allows the operator to select the charging information (CI), which contains the requested power amount (RPA) and the charging end time (CET). This will initiate a charging request between the operator's SC (on behalf of the operator) and the EVSE. An initial message (InMess) containing the $P_{ID}$, $h(HS_{ID})$, the hash of the user's smart card number h(SCN), the hash of the vehicle ID $h(V_{ID})$ and the CI is sent from the operator's SC to the EVSE.

Computer readable memory of the EVSE, or a connected local database, is configured to store a hash of smart card number (SCN), h(SCN), and a hash of the vehicle ID ($V_{ID}$), $h(V_{ID})$. The message transmitted to the EVSE, InMess, preferably includes the identification data noted above in the form of h(SCN) and $h(V_{ID})$. Upon receiving the h(SCN) and $h(V_{ID})$ from the smart card, the EVSE checks to see if the h(SCN) and $h(V_{ID})$ pair received from the smart card are locally available in the EVSE or in the local database. If the operator's information was stored locally, then the user has a private privileged access and the EVSE immediately allows charging without any further authorization check. However, for the purpose of fair payment, the EVSE can prepare an electric consumption report (ECR) in the name of the current consuming user and send it to a company's database (for private charging in companies) or to the supplier, as needed.

FIG. 1 illustrates the relatively simple situation in which the user/operator of the EV is also the home user with private privileged access to the EVSE. Here, the user/operator is charging the EV at his or her home (or some other charging point private to the operator). In this case, the parties and equipment engaged in communication are the user (U) of the EV, the electric vehicle supply equipment (EVSE) 10, the smart meter (SM) 12, the home aggregator (HAG) 16 and the home supplier (HS) 20. Communication between SM 12 and HAG 16 is shown as being through a wireless network 14, such as the 3G or GSM network, although it should be understood that any suitable type of wired or wireless communication network and/or protocol may be used. Similarly, it should be understood that any suitable type of wired or wireless communication network 18 and/or protocol may be used for communication between HAG 16 and HS 20.

The user is an electricity consumer who has a contract with a supplier. The EVSE 10 is an intelligent device that is used as a charging point connecting the EV to a smart grid system. The smart meter 12 is a smart electronic device that continuously records electric energy consumption and sends it to the supplier at some selected interval. A supplier, as used herein, is a company that sells electricity to customers. The supplier with whom the user has a contract is the home supplier (HS) 20. In this case, there are also other entities who are responsible for optimizing the charging process and aggregating the power discharged from electric vehicles. These are known as "aggregators". Aggregators sign contracts with other suppliers and provide services to end users. Different names are given to aggregators based on their location relative to the user's home. The home aggregator (HAG) 16 is the aggregator that takes this responsibility in the user's contracted location.

As will be described in greater detail below, the user may engage in either internal roaming charging (IRC) or external roaming charging (ERC). During IRC, the user communicates with an aggregator other than the HAG, but still within the home supplier network. This other aggregator is referred to as the visiting aggregator (VAG). There is also a third kind of aggregator, referred to as an external aggregator (EAG). EAGs are those who belong to external supplier networks.

For home charging, authentication is performed locally on the EVSE. It should be understood that any suitable type of communication network can be used between the different entities and equipment in the charging architecture. For example, communication between the EV and EVSE 10 may be performed through power line communication (PLC). With PLC, it is assumed that communication is secure and there is no need to consider extra security between the EV and EVSE 10. EVSE 10 and SM 12 can be connected to each other using any suitable type of wired or wireless communication. A private access privilege charging scheme is also possible in companies. A company could allow its employees to charge as privileged users for free or for discounted payment. This is similar to home charging, where authentication is performed locally on the authentication server.

If the operator is determined to not be a home user, a notification message is transmitted to an owner of the electric vehicle supply equipment. For example, for a charging point that belongs to individuals, the supplier of the charging point owner could contact the owner through communication methods such as SMS text message or the like. The owner transmits an authorization message back to the EVSE. In the notification message, the owner is asked to grant or deny the guest user permission to charge at the charging location. The owner is further asked to choose from different payment options, as will be described in greater detail below. Similarly, for a guest user who wants to charge at a partner company, the authentication server of the company could notify a concierge to give the required permissions in the form of a temporary privilege. In both cases, the owner's response may be either to deny charging, allow charging for free, or allow charging for a fee. If the owner chooses to deny charging, the EVSE acts accordingly.

If the authorization message authorizes the operator of the electric vehicle as a guest user, with no fees charged to the operator of the EV, then the battery of the EV is charged and a charging fee associated therewith is debited from an account of the owner of the electric vehicle supply equipment. If the authorization message authorizes the operator to use the EVSE for a fee, then it is next determined if the operator of the electric vehicle is requesting internal roaming charging (IRC) or external roaming charging (ERC). Internal roaming charging is charging of the battery of the electric vehicle at electric vehicle supply equipment not associated with the operator (i.e., EVSE which is not the operator's private, privileged access EVSE) but within a supplier network associated with the operator. External roaming charging is charging of the battery of the electric vehicle at electric vehicle supply equipment not belonging to the supplier network associated with the operator.

Figure 2:
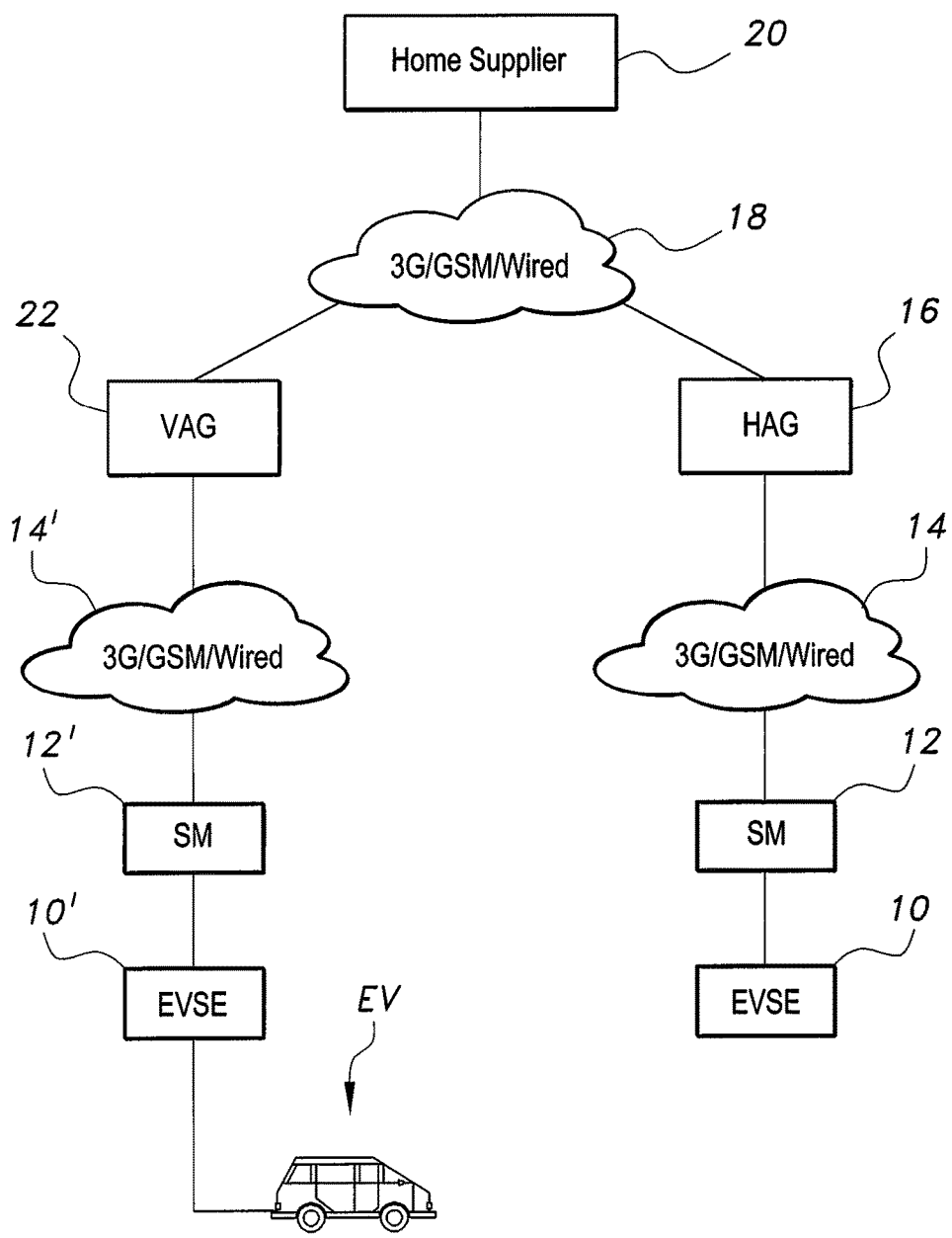
FIG. 2 diagrammatically illustrates the method of location-based charging for electric vehicles operating in an internal roaming charging mode.

FIG. 2 illustrates IRC, which is similar to the home charging of FIG. 1, but in which the operator connects the EV to EVSE 10' (which is remote from the operator's home EVSE 10). Similar to the operator's home system including SM 12 (in communication with EVSE 10), which communicates with HAG 16 through network 14, EVSE 10' communicates with smart meter 12', which communicates with visiting aggregator (VAG) 22 through network 14'. VAG 22 communicates with HS 20 through network 18.

Figure 3:
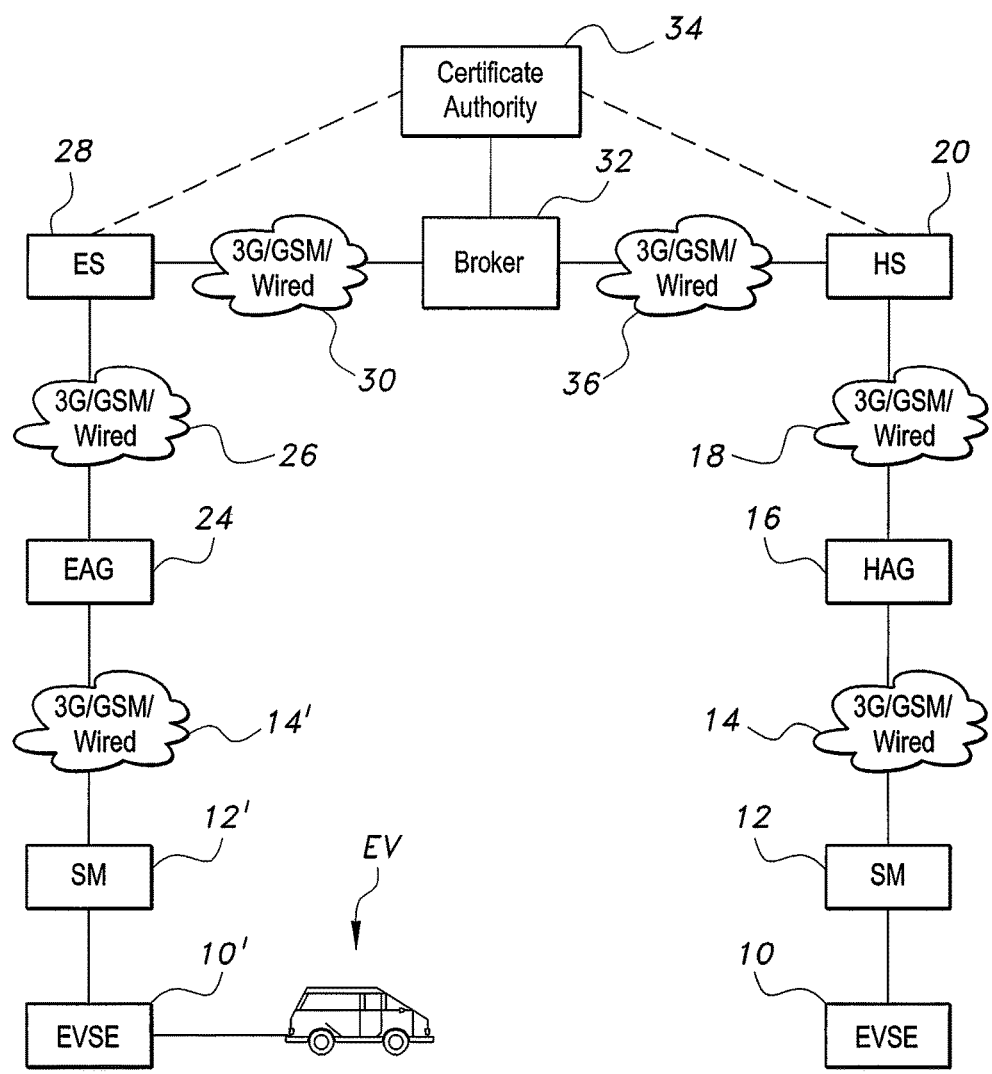
FIG. 3 diagrammatically illustrates the method of location-based charging for electric vehicles operating in an external roaming charging mode.

In the ERC scenario of FIG. 3, the EV is connected to EVSE 10', but rather than communicating with VAG 22, as in the IRC scenario of FIG. 2, SM 12' communicates with an external aggregator 24 through network 14'. The external aggregator (EAG) 24 communicates with an external supplier 28 through network 26. The external supplier (ES) is a supplier other than the home supplier (HS) 20. External supplier 28 communicates to a broker (BR) 32 through network 30. It should be noted that home supplier 20 is also linked to broker 32 through network 36. The broker (BR) 32 is a trusted third party that acts as a mediator between home and external suppliers for authorization, payment transaction, to solve disputes and to protect the user from privacy breaches. BR 32 facilitates communication between the suppliers without them revealing their identities to each other. Public key cryptography is used for communication between the different entities in this charging model. Thus, a trusted certificate authority (CA) 34 that issues certificates for suppliers and brokers is also included in the model.

The certificate authority (CA) 34 generates and distributes certificates for suppliers and the broker (BR) 32. Further, each supplier 20, 28 publishes its public key to the other supplier and the broker 32. The suppliers 20, 28 register with the broker 32 by presenting their credentials. The suppliers also open billing with the broker. The aggregators 16, 24 establish an agreement with their respective suppliers 20, 28 to provide charging/discharging service to the end users. During the contract agreement, the aggregators get certificates from the suppliers. The aggregators also get the list of public keys of the smart meters for the area where they are going to provide the service.

Determination of IRC or ERC is based on the set of operator-specific parameters. The parameters transmitted to the EVSE includes a hash of the operator's home supplier ID ($HS_{ID}$), $h(HS_{ID})$. The EVSE also stores the hash of its own supplier ID. Thus, when the EVSE receives the initial message containing the $h(HS_{ID})$, it is able to check whether the operator belongs to the same supplier as that of the EVSE or not by comparing the $h(HS_{ID})$ with the hash value of the supplier ID stored in the EVSE. If the two hash values match, the IRC protocol will be applied, otherwise, the ERC protocol will be selected.

The content of the initial response message (InResMess) from the EVSE to the SC depends on the outcome of this comparison. In the case of IRC, the EVSE prepares an initial response message (InResMess) by concatenating the InMess with a unique transaction ID (TID), charging rate (CR) and maximum payment (MP). The MP is the approximate maximum payment that the operator will be asked to pay for the requested amount of power calculated at the price rate of CR. This allows for uniquely identifying the specific charging using the TID, yielding a unique number to identify the particular charging session. The MP is used for payment authorization purposes. The actual power usage and actual payment will be calculated after charging has been completed. This is because the operator may decide to stop charging in the middle or before the maximum requested power is reached.

An internal charging rate is associated with internal roaming charging (IRC) and an external charging rate is associated with external roaming charging (ERC). Once it is determined whether the operator of the EV is requesting IRC or ERC, the battery of the electric vehicle is charged and the operator's account is debited by a charging fee based on whether the internal charging rate or the external charging rate is being applied. For commercial charging points, it is possible to configure the EVSE to skip steps that check private and guest charging and consider only the IRC and ERC.

For purposes of security and privacy, anonymous charging and payment are made possible through usage of a nested signature. Nested signatures are used to prepare charging request messages. During roaming charging, charging request messages need to travel through foreign networks towards the home supplier. Thus, without added security, the operator is at risk of sensitive information being revealed to external entities such as the external aggregator (EAG), the external supplier (ES) or broker (BR). Likewise, the external entities may also need to hide the content of the charging request message related to them from the home supplier and BR. Further, the external suppliers and the brokers need not have the same level of access to the operator's information. This security issue is addressed by dividing the message into portions and encrypting them with different keys such that each entity along the path can only see the message intended for it and not the other parts. However, in case of a dispute, the different parts of the charging request message should be able to be linked together in order to resolve the dispute. This is achieved by using nested signatures (i.e., dual and triple signatures). Dual signatures and triple signatures are used to prepare the charging request for IRC and ERC, respectively.

In the case of IRC (i.e., dual signature encryption), the smart card (SC) first generates the necessary dual signature. The dual signature includes charging order information (COI) and billing information (BI). The COI includes the $P_{ID}$, transaction ID, CI, CR and MP received during the initial response phase. The BI includes the $P_{ID}$, TID, $U_{ID}$ and MP. The SC prepares the charging request (CReQ). The CReQ consists of two parts, namely a first part conveyed to the visiting aggregator (VAG) and a second part conveyed to the home supplier (HS). The second part, targeted to the HS, is encrypted using HS's public key. The SC also attaches a time stamp to the CReQ message.

The SC then sends the charging request message to the EVSE. The message is delivered from the EVSE to the SM, then to the VAG, and finally to the HS. At each stage, the CReQ message is encrypted using the public key of the receiver and signed by the private key of the sender. By sending the CReQ message this way, the CReQ is kept secure throughout the communication. Moreover, the operator remains anonymous to the VAG, as the $U_{ID}$ is only included in the BI, which is not accessible to the VAG. Further, the VAG cannot track the user using the $P_{ID}$ information since the $P_{ID}$ is not the real vehicle ID. However, the HS is able to retrieve the real vehicle ID corresponding to the $P_{ID}$, since the mapping between the real vehicle ID and the $P_{ID}$ is found in the HS's database. Therefore, the HS can authenticate and also bill the user using the $U_{ID}$ and the real vehicle ID. Furthermore, the HS will not see the CI and the CR, which are related to the charging information only. The VAG and HS can uniquely identify the specific charging using the TID and the $P_{ID}$.

For ERC (i.e., triple signature encryption), the SC first generates the needed triple signature (TS). The triple signature is prepared from the hash of three parts: charging order information (COI), authorization information (AI) and billing information (BI). External aggregators/suppliers have the same level of access to the operator's information and can only see the COI. AI contains information required for authorization by the BR. The BR can see the content of the AI but not the COI and the BI. The BI, on the other hand, is allowed to be seen only by the home supplier. The COI includes the pseudonym ID ($P_{ID}$), transaction ID (TID), charging information (CI), charging rate (CR) and maximum payment (MP). The AI includes the pseudonym ID ($P_{ID}$), transaction ID (TID), home supplier ID ($HS_{ID}$) and maximum payment (MP). The BI includes the pseudonym ID ($P_{ID}$), transaction ID (TID), user ID ($U_{ID}$) and maximum payment (MP).

The SC then prepares the charging request (CReQ), which contains three parts: a message to the external supplier (MtoES), a message to the broker (MtoBR) and a message to the home supplier (MtoHS). The parts of the message that go to the BR and the HS are encrypted with shared secret keys $K_1$ and $K_2$. The SC then sends the charging request message to the EVSE.

The CReQ is then transferred from the EVSE to the SM, then from the SM to the external aggregator (EAG), and from the EAG to the external supplier (ES). When it reaches the ES, the ES sends MtoBR II MtoHS to the BR. The BR, on the other hand, transmits MtoHS to the HS. Similar to the IRC case, at each stage, the CReQ message is encrypted using the public key of the receiver and signed by the private key of the sender. Following the same protocol, only the HS can know the real identity of the user. The EAG, ES and BR cannot know the identity of the user. Moreover, the EAG and ES cannot know the identity of the HS, since the ID of the HS is embedded in the AI, which is only accessible by the BR.

The ES and the HS need to communicate for user authorization and payment transaction purposes. However, revealing the identity of the ES to the HS may lead to a user privacy breach by the home supplier. Therefore, to avoid any potential privacy breaches, anonymous message exchange is used between suppliers. The method described above relies on nested signatures and the BR as intermediary to achieve anonymity and to facilitate payment transaction between suppliers. Once the ES has received the CReQ message from the user, it saves the MtoES and forwards MtoBR∥MtoHS to the BR. When the BR receives MtoBR∥MtoHS from the ES, it takes MtoBR and forwards MtoHS to the HS. The BR can get the supplier ID of the HS from the AI information in the MtoBR. At this point, the BR knows the real identity of the ES and the HS. However, the two do not know each other.

After the involved parties each receive their part of the CReQ message, authorization is performed as follows: The HS replies to the BR with the authorization response (AuthReS), which includes a decision of either "Allow" or "Deny". To avoid repudiation, the AuthReS is signed by the HS. When the BR receives the AuthReS, it verifies that the AuthReS originated from the HS. The BR then signs it and sends it to the ES. Since all parties (ES, BR and HS) have received $P_{ID}\|TID\|MP$ during the CReQ message, they can uniquely differentiate the specific charging session using TID. The signed AuthReS from the BR is taken by the ES as a guarantee that the HS has authorized the user and that the ES will get its money. The ES then sends it back. After charging has finished, the operator signs the electric consumption report (ECR) using his or her public key and sends it to the EVSE. All entities (EAG, ES, BR and HS) receive a copy of the ECR. The BR transfers money from the HS's account to the ES's account using the TID number as reference. The HS, on the other hand, bills the user using the same TID. In this way, authorization and payment transaction is performed without the ES and the HS revealing their identities to each other.

It is to be understood that the present invention is not limited to the embodiments described above, but encompasses any and all embodiments within the scope of the following claims.

We claim:

1. A secure charging method for electric vehicles, comprising the steps of:
   connecting an electric vehicle to electric vehicle supply equipment;
   receiving at the electric vehicle supply equipment a set of operator-specific parameters associated with an operator of the electric vehicle, wherein the set of operator-specific parameters comprise operator identification data, identification data representative of a home supplier associated with the operator, electric vehicle identification data, a requested power amount and a charging end time;
   determining from the set of operator-specific parameters if the operator is a home user having private privileged access to the electric vehicle supply equipment;
   charging a battery of the electric vehicle if the operator is determined to be a home user;
   transmitting a notification message to an owner of the electric vehicle supply equipment if the operator is determined not to be a home user;
   receiving an authorization message from the owner of the electric vehicle supply equipment;
   charging the battery of the electric vehicle and debiting a charging fee associated therewith from an account of the owner of the electric vehicle supply equipment if the authorization message authorized the operator of the electric vehicle as a guest user;
   determining if the operator of the electric vehicle is requesting internal roaming charging or external roaming charging if the authorization message authorized the operator of the electric vehicle to charge the battery of the electric vehicle for a fee, wherein internal roaming charging comprises charging of the battery of the electric vehicle at electric vehicle supply equipment not associated with the operator but within a supplier network associated with the operator, and external roaming charging comprises charging of the battery of the electric vehicle at electric vehicle supply equipment not belonging to the supplier network associated with the operator; and
   charging the battery of the electric vehicle and debiting the charging fee associated therewith from an account of the operator of the electric vehicle, wherein the charging fee is determined from a charging rate selected from the group consisting of an internal charging rate and an external charging rate, wherein the internal charging rate is applied for internal roaming charging and the external charging rate is applied for external roaming charging.

2. The secure charging method for electric vehicles as recited in claim 1, further comprising the step of transmitting a charging request from the operator of the electric vehicle to the electric vehicle supply equipment.

3. The secure charging method for electric vehicles as recited in claim 2, further comprising the step of applying dual signature encryption to the charging request if the operator of the electric vehicle requests internal roaming charging.

4. The secure charging method for electric vehicles as recited in claim 3, further comprising the steps of:
   encrypting a first portion of the charging request with a first encryption protocol; and
   encrypting a second portion of the charging request with a second encryption protocol.

5. The secure charging method for electric vehicles as recited in claim 4, further comprising the steps of:
   transmitting the first portion of the charging request to a visiting aggregator, wherein the first portion of the charging request comprises charging order information; and
   transmitting the second portion of the charging request to the home supplier associated with the operator, wherein the second portion of the charging request comprises billing information.

6. The secure charging method for electric vehicles as recited in claim 2, further comprising the step of applying triple signature encryption to the charging request if the operator of the electric vehicle requests external roaming charging.

7. The secure charging method for electric vehicles as recited in claim 6, further comprising the steps of:
   encrypting a first portion of the charging request with a first encryption protocol;
   encrypting a second portion of the charging request with a second encryption protocol; and
   encrypting a third portion of the charging request with a third encryption protocol.

8. The secure charging method for electric vehicles as recited in claim 7, further comprising the steps of:
   transmitting the first portion of the charging request to an external aggregator, wherein the first portion of the charging request comprises charging order information;

transmitting the second portion of the charging request to a broker, wherein the second portion of the charging request comprises authorization information; and transmitting the third portion of the charging request to the home supplier associated with the operator, wherein the third portion of the charging request comprises billing information.

* * * * *